United States Patent [19]
Craigie

[11] 3,898,909

[45] Aug. 12, 1975

[54] EJECTOR RELEASE UNIT FOR USE IN AIRCRAFT

[75] Inventor: Samuel W. Craigie, Maidenhead, England

[73] Assignee: M. L. Aviation Company Limited, Slough, England

[22] Filed: Mar. 4, 1974

[21] Appl. No.: 447,812

[30] Foreign Application Priority Data
Mar. 5, 1973 United Kingdom............... 10474/73

[52] U.S. Cl........... 89/1.5 F; 244/137 R; 294/83 AE
[51] Int. Cl............................................... B64d 1/12
[58] Field of Search.................. 89/1.5 R, 1.5 F; 244/137 R; 294/83 AE

[56] References Cited
UNITED STATES PATENTS
3,056,623   10/1963   Herbert............................. 89/1.5 F

*Primary Examiner*—Stephen C. Bentley
*Attorney, Agent, or Firm*—Brisebois & Kruger

[57] ABSTRACT

This invention is concerned with an ejector release unit for releasing and projecting a store from an aircraft. The unit comprises a pair of telescopic ejection guns for projecting the store from the aircraft and a releasable latching mechanism for supporting the store, having an inner pair of pivoted hooks located between the ejection guns which are swung from their operative positions by means of links controlled by a central toggle mechanism, and an outer pair of hooks located outside the ejection guns, each of the hooks being held in its operative position by a separate toggle linkage which is released by means of a link controlled from the central toggle linkage, which is so located in a lateral direction as to pass to one side of the respective ejection gun. Each of the separate toggle linkages are preferably braced in a position just past dead-centre and is released by turning one of the links through the dead-centre position by means of a short connecting arm fixed to the link in question and acted on by the link controlled from the central toggle linkage.

2 Claims, 1 Drawing Figure

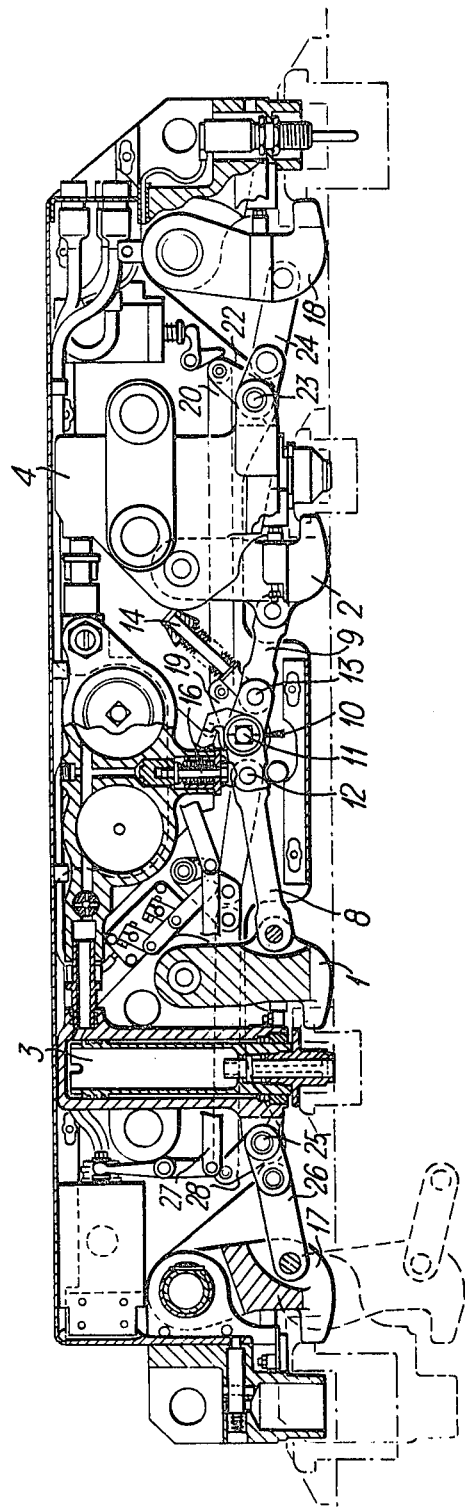

EJECTOR RELEASE UNIT FOR USE IN AIRCRAFT

This invention relates to ejector release units for releasing and projecting stores such as bombs and similar heavy objects from aircraft. Examples of such units are described in our prior British Pat. specifications Nos. 1,058,997 and 1,248,926 and comprise basically a pair of telescopic ejection guns for projecting the store from the aircraft and a releasable latching mechanism for supporting the store. Both of these mechanisms are operated by high pressure gas from explosive cartridges and, in practice two such cartridges are always fitted so as to overcome the risk of one cartridge misfiring.

The latching mechanism comprises a pair of pivoted hooks which are swung from their operative positions by means of links controlled by a central toggle mechanism. This comprises a lever turning about a fixed pivot, of which one end bears against a rod extending from a piston controlled by pressure gas from the cartridges when the unit is operated. The other end of the link is pivoted to a compression spring which tends to turn the lever and press it against the piston rod, but which is mounted at an angle to the lever so that when the lever is turned by means of the piston, it first reaches a dead-centre position in which it extends in line with the spring and then moves through this position under the thrust from the spring so that the toggle collapses and the resultant movement serves to withdraw the two hooks from their operative positions.

Stores to be carried by units such as this have their lugs, which are engaged by the hooks, situated a standard distance apart which depends on the size of the store. To avoid the need for different ejector release units for each size of store, it is convenient for a single construction of unit to be able to support and release two different sizes of store, that is to say two sizes of store with their lugs spaced apart by two different standard distances. For this purpose the units may be provided with two pairs of hooks, the inner pair cooperating together to support stores with lugs at the smaller standard spacing and the outer pair cooperating to support stores with lugs at the larger standard spacing. A single pair of ejection guns is sufficient for both sizes of store and these may be located so as to act between the inner and outer hooks at each end. In other words the unit comprises an inner pair of pivoted hooks located between the ejection guns and an outer pair of hooks located outside the ejection guns.

The same firing mechanism is used whichever size of store may be carried and it is therefore desirable for both pairs of hooks to be released by a single common mechanism. The toggle mechanism already described is quite adequate for the inner pair of hooks, but owing to the presence of the ejection guns between the inner and outer hooks at each end, it is not possible merely to provide an extension to each of the links for the purpose of releasing the outer pair of hooks at the same time as the inner pair of hooks.

According to the present invention, each of the outer pair of hooks is held in its operative position by a separate toggle linkage which is released by means of a link controlled from the central toggle linkage, which is so located in a lateral direction as to pass to one side of the respective ejection gun. Each of the separate toggle linkages may be braced in a position just past dead-centre and may be released by turning one of the links through the dead-centre position by means of a short connecting arm fixed to the link in question and acted on by the link controlled from the central toggle linkage.

An example of mechanism in accordance with the invention can best be described with reference to the accompanying drawing. As shown in this drawing, a pair of inner hooks 1 and 2 are located between a pair of ejection guns 3 and 4. The hooks 1 and 2 are operated by a central toggle linkage. The central toggle linkage comprises a lever 10 acted on towards its left-hand end at 12 by a piston 16. The lever 10 is pivoted at 11, and extends on the right-hand side of this pivot to 13 where it is acted on by a compression spring 14. The compression in the spring tends to turn the lever 10 in a clockwise direction so as to cause it to bear against the bottom of a piston 16. The combination of the lever 10 and the spring 14 comprises the toggle linkage and when the piston 16 is operated, so as to turn the lever 10 in a counterclockwise direction, the lever turns through a dead-centre position in which it is in line with the spring 14 and then further movement causes the toggle linkage to collapse. Collapse of the toggle linkage causes the point 13 to move to the left, thus releasing the hook 2 by way of a link 9 and releasing the hook 1 by way of a link 8.

In addition, it is necessary to release also the outer pair of hooks 17 and 18 which are situated outside the ejection guns 3 and 4. An arm 19, also fixed to the shaft 11 extends upwardly and to the right where it is pivoted to a link 20 extending parallel with the link 9, but displaced from the centre-line so as to pass to one side of the ejection gun 4. At the opposite end, this link is connected to a short arm 22 extending upwardly from a shaft 23 to which is fixed one of the links 24 constituting the toggle holding the hook 18 at this end in its operative position. Consequently, when the central toggle linkage collapses and the link 9 moves to the left as already described, the additional link 20 will move to the left also, thus turning the shaft 23 to which one link 24 of the braced toggle is connected, allowing this toggle to collapse and thus releasing the associated hook 18.

A generally similar connection is made to the outer hook 17 at the left-hand end which is also held in its operation position by a braced toggle linkage which is released by rotation of a shaft 25 to which one of the links 26 is fixed. For this purpose a link 27 similar to the link 8 which operates the hook 1, but longer, is pivoted to the central toggle at 12 and this link extends above the link 8, passing to one side of the ejection gun 3 and being connected to a short arm 28 projecting upwardly from the shaft 25 to which one link 26 of the bracing toggle is fixed as previously described. Consequently, when the central toggle collapses and the point 12 moves to the right, the link 27 lying above the link 28 also moves to the right, thus turning the shaft 25 to which one link 26 of the bracing toggle is connected and allowing this toggle also to release its hook 17. In other words, when the central toggle collapses it releases both pairs of hooks simultaneously and can thus either release a relatively small store supported by the inner pair of hooks 1, 2 or a larger store secured by the outer pair of hooks 17, 18.

I claim:

1. In an ejector release unit for releasing and projecting a store from an aircraft, a pair of telescopic ejection guns for projecting said store from said aircraft and a releasable latching mechanism for supporting said store, said latching mechanism including an inner pair of hooks mounted for pivotal movement and located between said ejection guns and first links connected to said inner hooks for swinging them from their operative positions, a central toggle mechanism controlling said first links, and an outer pair of hooks mounted for pivotal movement and located outside said ejection guns, a second link connected to each said outer hook, each of said second links being connected to a separate toggle linkage to hold each of said outer hooks in its operative position, each of said separate toggle linkages being controlled by said central toggle mechanism and each of said second links being so located in a lateral direction so as to pass to one side of said respective ejection gun.

2. An ejector release unit according to claim 1, in which each of the separate toggle linkages is braced in a position just past dead-centre and is released by turning one of the links through the dead-centre position by means of a short connecting arm fixed to the link in question and acted on by the link controlled from the central toggle linkage.

* * * * *